United States Patent
Chung

(10) Patent No.: US 6,547,316 B2
(45) Date of Patent: Apr. 15, 2003

(54) FENDER PANEL IMPACT ABSORPTION STRUCTURE OF VEHICLE HAVING WALKER PROTECTION FUNCTION

(75) Inventor: Ho-Gie Chung, Hwasung (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/974,363

(22) Filed: Oct. 10, 2001

(65) Prior Publication Data

US 2002/0060474 A1 May 23, 2002

(30) Foreign Application Priority Data

Nov. 12, 2000 (KR) ............................... 2000-69073

(51) Int. Cl.⁷ .............................................. B60R 27/00
(52) U.S. Cl. ...................................... 296/189; 296/194
(58) Field of Search ................................ 296/189, 194; 180/271, 281, 274, 69.21

(56) References Cited

U.S. PATENT DOCUMENTS

| | | | | |
|---|---|---|---|---|
| 3,709,316 A | * | 1/1973 | Glance | 296/194 |
| 3,791,692 A | * | 2/1974 | Piere | 296/189 |
| 3,909,058 A | * | 9/1975 | Kramer et al. | 296/189 |
| 4,249,632 A | * | 2/1981 | Lucchini et al. | 180/69.2 |
| 4,359,120 A | * | 11/1982 | Schmidt et al. | 296/189 |
| 5,115,878 A | * | 5/1992 | Hayata | 296/189 |
| 5,605,371 A | * | 2/1997 | Borchelt et al. | 296/188 |
| 5,988,305 A | * | 11/1999 | Sakai et al. | 296/189 |
| 6,179,364 B1 | * | 1/2001 | Takahashi | 296/191 |
| 6,182,782 B1 | * | 2/2001 | Matsuura et al. | 280/730.1 |
| 6,237,922 B1 | * | 5/2001 | Armstrong | 277/634 |

* cited by examiner

*Primary Examiner*—D. Glenn Dayoan
*Assistant Examiner*—Lori L Coletta
(74) *Attorney, Agent, or Firm*—Christie, Parker & Hale, LLP

(57) ABSTRACT

The present invention relates to a fender panel impact absorption structure having a walker protection function in which an impact absorption unit is installed between a fender panel and the top of an apron panel to secure space enough to absorb the impact energy to the maximum level and minimize a walker's injury when the walker is bumped to the fender panel, the unit being constructed by fastening together the end of a bent part of a fender panel positioned under a hood panel and the top of an apron panel, the structure having an impact absorption unit whose top and bottom parts are bent toward one direction for being connected and installed between the end of the bent part of the fender panel and the top of the apron panel, the top part being fastened with the end of the bent part of the fender panel and the bottom part being fastened to the apron panel with a fixing member.

4 Claims, 4 Drawing Sheets

US 6,547,316 B2

FENDER PANEL IMPACT ABSORPTION STRUCTURE OF VEHICLE HAVING WALKER PROTECTION FUNCTION

CROSS-REFERENCE TO RELATED APPLICATION

This application claims priority of Korea patent Application No. 2000-69073, filed on Nov. 12, 2000.

1. Field of the Invention

The present invention relates to a fender panel impact absorption structure of vehicle having a walker protection function and more particularly to a fender panel impact absorption structure having a walker protection function in which an impact absorption unit is formed between the top of a fender panel and an apron panel to absorb an impact to the fender panel and a space is secured between the fender panel and the apron panel for absorption of the impact when the upper fastening part of the impact absorption unit is broken down.

2. Background of the Invention

In general, a vehicle hood panel or fender panel should elastically deform in the event that a walker gets bumped by the vehicle. It is most important to design a vehicle to minimize a walker's injury by enabling an impact to a walker to be absorbed to the maximum extent.

A fender panel impact absorption structure is constructed, as shown in FIGS. 1 and 2, having a lower surface of vent part 11 of a fender panel 10 is placed on the upper surface of an apron panel 20, and a bent part 11 of the fender panel 10 and an apron panel 20 are penetrated with bolts 21 and fixed with nuts 22.

However, since the apron panel 20 and the fender panel 10 is very firmly fastened, there has been a problem that they do not absorb the impact energy much in the event of a crash to a walker, only to increase the degree of his or her injury.

Besides, there has been another problem in the conventional structure where the bent part 11 of a fender panel 10 is fastened on the upper surface of the apron panel 20 with bolts 21 in that the fender panel 10 and apron panel 20 cannot be deformed much enough by the crash to a walker because the gap between the upper part of the apron panel 20 and the fender panel 10 is very narrow, but results in more severe injury to the walker.

SUMMARY OF THE INVENTION

It is an object of the present invention to solve the aforementioned problems and provide a fender panel impact absorption structure having a walker protection function.

In order to accomplish the aforementioned object of the present invention, there is provided a fender panel impact absorption structure having a walker protection function constructed by fastening together an end of a bent part of a fender panel positioned under a hood panel and a top of an apron panel, the structure having an impact absorption unit whose top and bottom parts are bent toward one direction to be connected and installed between the end of the bent part of the fender panel and the top of the apron panel, the top part being fastened with the end of the bent part of the fender panel and the bottom part being fastened to the apron panel with a fixing member.

In addition, the impact absorption unit is made of a plastic material with a bent groove being formed at the center thereof, a reinforcing rib being formed at a lower bent part thereof and a fastening part being formed at an end of the upper bent part thereof to enable the end of the bent part of the fender panel to be inserted and fit to.

BRIEF DESCRIPTION OF THE DRAWINGS

For fuller understanding of the nature and object of the invention, reference should be made to the following detailed description taken in conjunction with the accompanying drawings in which.

DETAILED DESCRIPTION OF THE INVENTION

Hereinafter, a preferred embodiment of the present invention will be described in detail with reference to accompanying drawings.

Figure 1:
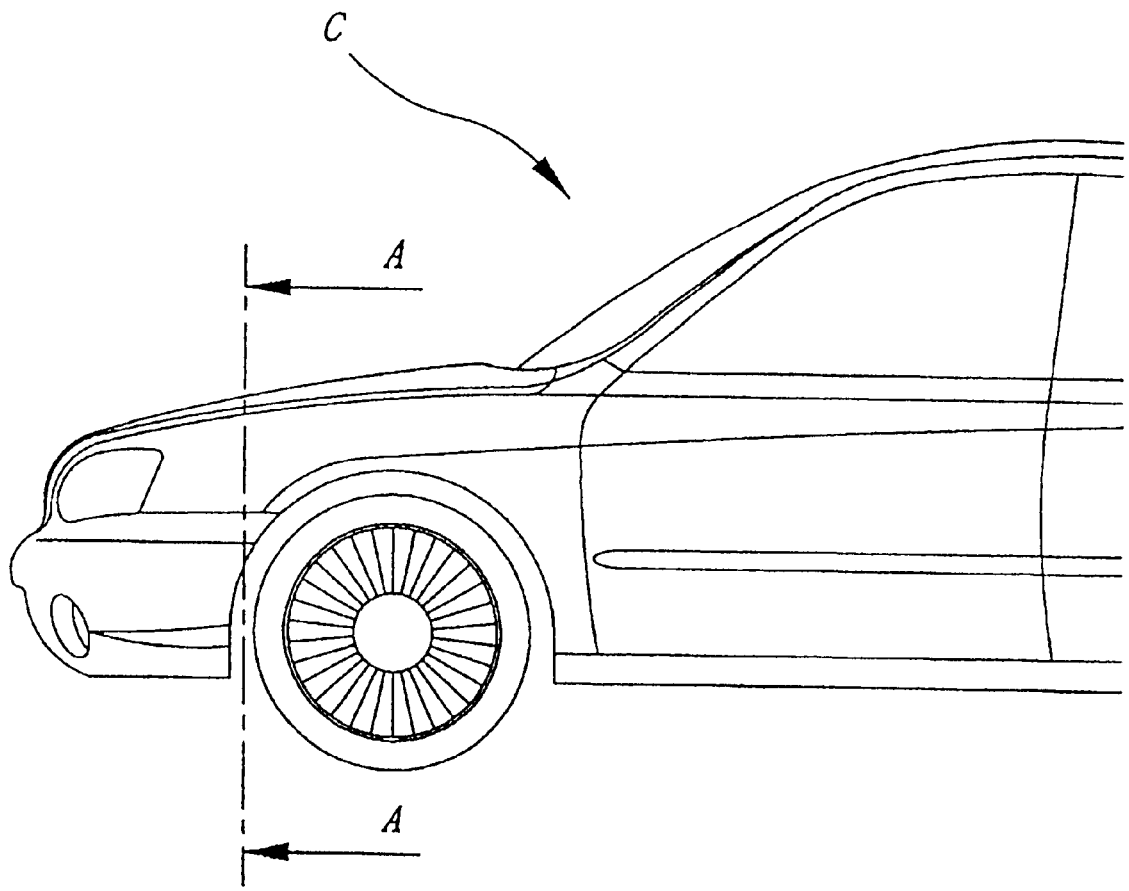
FIG. 1 is a lateral view for illustrating a general vehicle.
Figure 2:
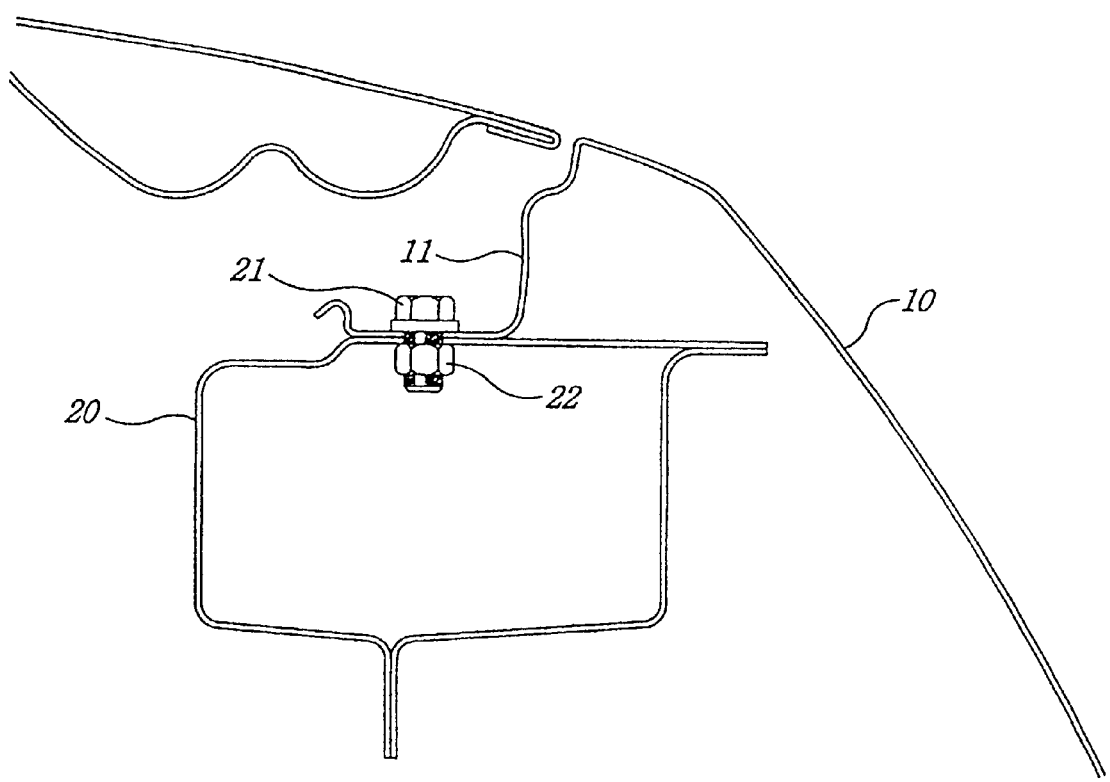
FIG. 2 is a cross-sectional view cut along line A—A in FIG. 2 for illustrating the conventional fender panel impact absorption structure of a vehicle having a walker protection function.
Figure 3:
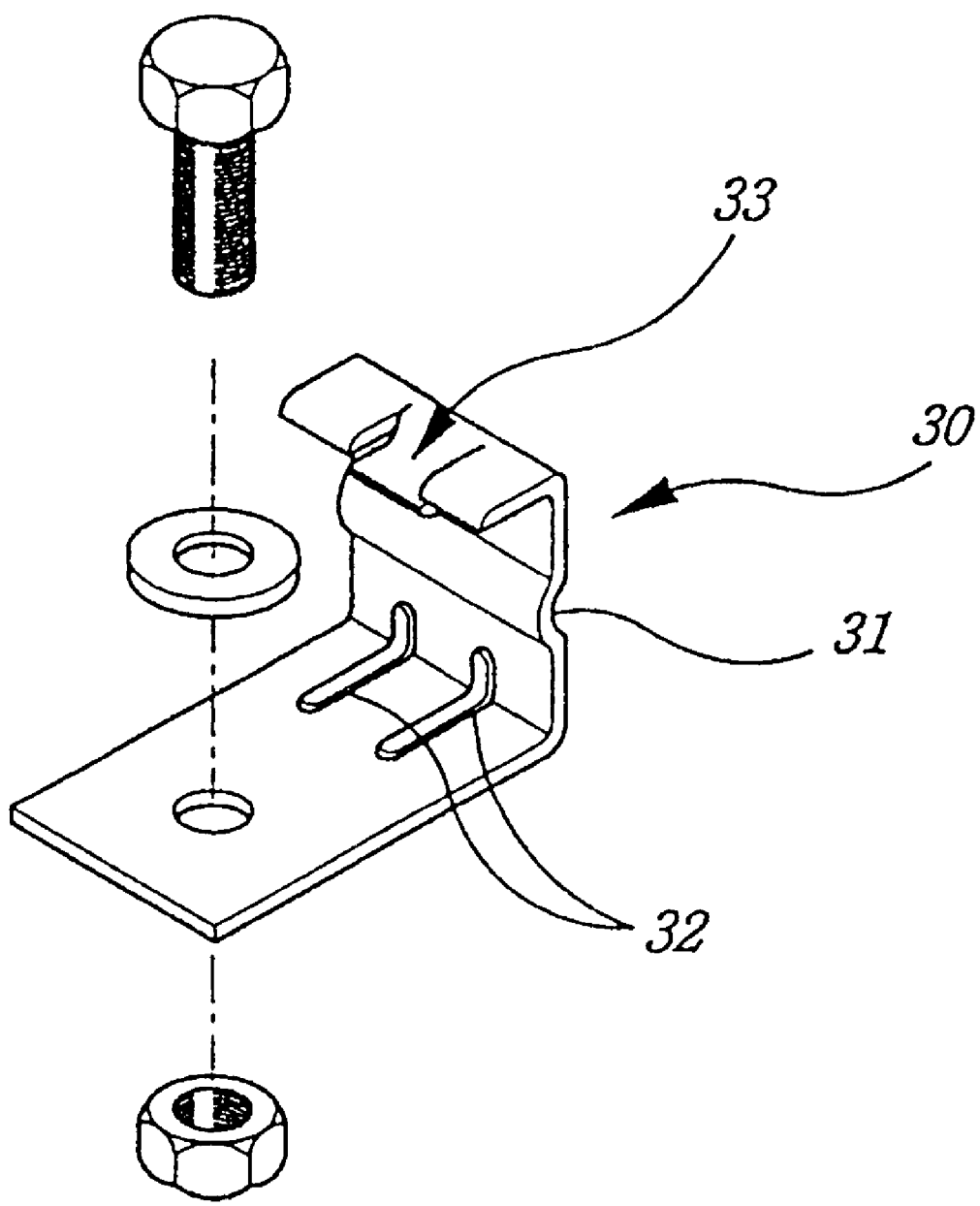
FIG. 3 is a perspective view for illustrating a fender panel impact absorption structure of a vehicle having a walker protection function in accordance with the present invention.
Figure 4:
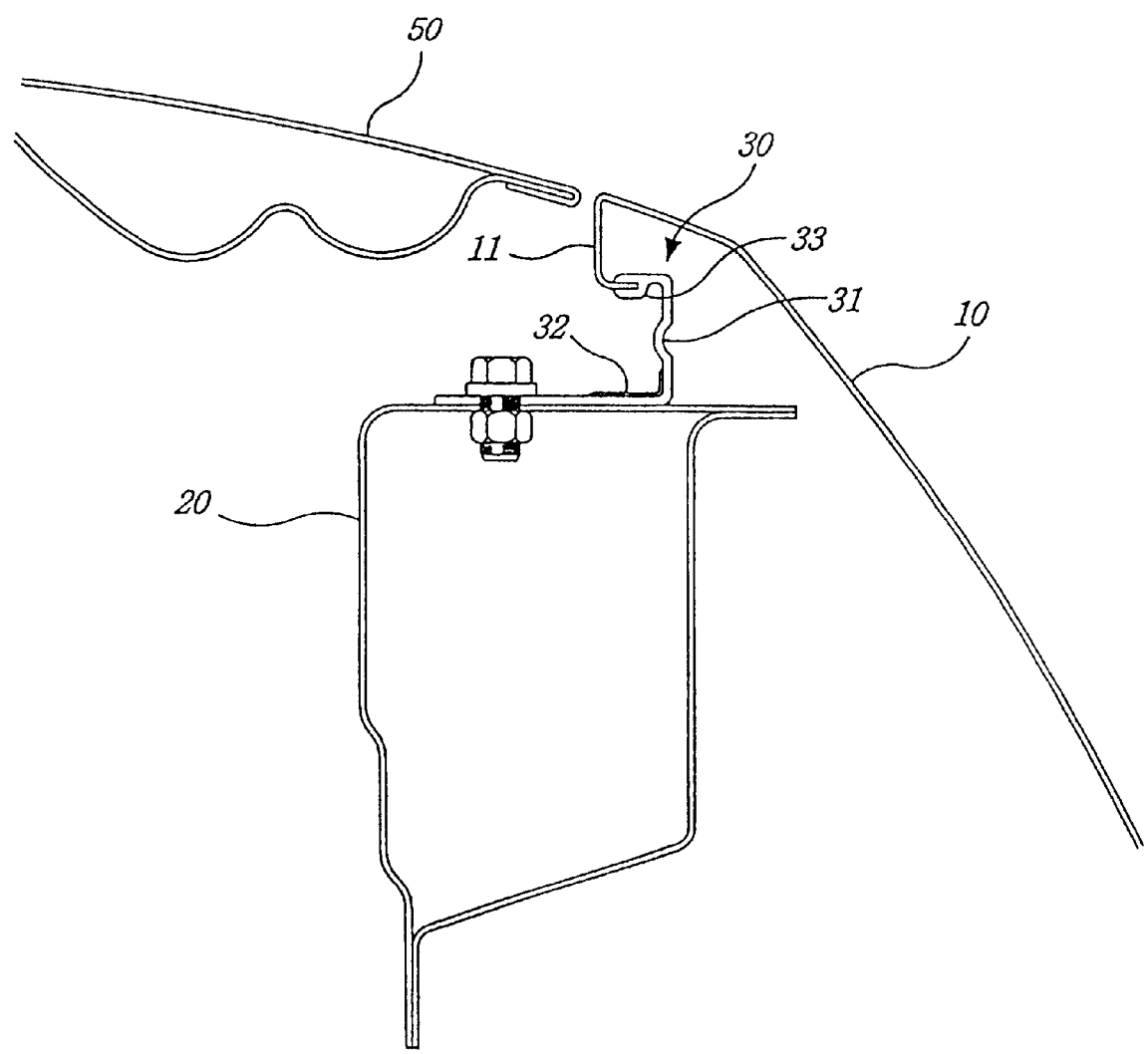
FIG. 4 is a cross-sectional view for illustrating a state of a fender panel impact absorption structure having a walker protection function applied to a fender panel of a vehicle in accordance with the present invention.

FIG. 3 is a perspective view for illustrating a fender panel impact absorption structure of a vehicle having a walker protection function in accordance with the present invention. FIG. 4 is a cross-sectional view for illustrating a state of a fender panel impact absorption structure having a walker protection function applied to a fender panel of a vehicle in accordance with the present invention.

As shown in FIGS. 3 and 4, the fender panel impact absorption structure of a car is constructed with an impact absorption unit 30 by fastening the end of a bent part 11 of a fender panel 10 positioned under a hood panel 50 and the top of an apron panel 20.

In other words, the impact absorption unit 30 is fastened between the end of the bent part 11 of the fender panel 10 and the top of the apron panel 20. When a walker is bumped to the fender panel 10 and hood panel, the impact energy is transmitted to a bent groove 31 formed in the impact absorption unit 30. The bent groove 31 of the impact absorption unit 30 absorbs and exhausts the impact energy.

In addition, if the impact energy exceeds a predetermined level thereof, a fastening part 33 into which the end of the bent part 11 of the fender panel 10 is inserted is broken to widen the impact energy absorption space of the fender panel 10. As a result, the level of impact energy to be absorbed by the impact absorption unit 30 gets greater.

Furthermore, at least one reinforcing rib 32 is added onto the lower, bent part of the impact absorption unit 30 for increasing strength and for securing stability when it is fastened with the apron panel 20.

In addition, the impact absorption unit 30 of the present invention is made of a plastic material to support the fender panel 10 and buffer an impact when the impact is made to the fender panel 10 which is then pushed toward the car body.

As described above, there is an advantage in the fender panel impact absorption structure having a walker protection function of the present invention in that the impact absorption unit is installed between the fender panel and the top of the apron panel to secure a big space enough to absorb the impact energy to the maximum level and minimize a walker's injury when the walker is bumped to the fender panel.

In addition, there is another advantage in the fender panel impact absorption structure having a walker protection function of the present invention in that the bent groove is formed at the center of the impact absorption unit for absorbing the impact energy to minimize a walker's injury when the walker is bumped to the fender panel.

What is claimed is:

1. A fender panel impact absorption structure having a walker protection function constructed by fastening together an end of a bent part of a fender panel positioned under a hood panel and a top of an apron panel, the structure having an impact absorption unit whose top and bottom parts are bent toward one direction for being connected and installed between the end of the bent part of the fender panel and the top of the apron panel, the top part being fastened with the end of the bent part of the fender panel and the bottom part being fastened to the apron panel with a fixing member, wherein a reinforcing rib is formed at a lower bent part of the impact absorption unit.

2. A fender panel impact absorption structure having a walker protection function constructed by fastening together an end of a bent part of a fender panel positioned under a hood panel and a top of an apron panel, the structure having an impact absorption unit whose top and bottom parts are bent toward one direction for being connected and installed between the end of the bent part of the fender panel and the top of the apron panel, the top part being fastened with the end of the bent part of the fender panel and the bottom part being fastened to the apron panel with a fixing member, wherein a fastening part is formed at an end of the upper bent part of the impact absorption unit to enable the end of the bent part of the fender panel to be inserted and fit to.

3. The structure, as defined in claim 1, wherein the impact absorption unit is made of a plastic material with a bent groove being formed at a center thereof.

4. The structure, as defined in claim 2, wherein the impact absorption unit is made of a plastic material with a bent groove being formed at a center thereof.

* * * * *